(12) United States Patent
Wicken et al.

(10) Patent No.: US 9,399,176 B1
(45) Date of Patent: Jul. 26, 2016

(54) HELIUM FREE BALLOON SUPPORT BRACKET SYSTEM

(71) Applicant: Balloon Innovations LLC, Westminster, CO (US)

(72) Inventors: Christopher J. Wicken, Littleton, CO (US); Gregg A. Wicken, Littleton, CO (US)

(73) Assignee: Balloon Innovations, Inc., Westminister, CO (US)

( * ) Notice: Subject to any disclaimer, the term of this patent is extended or adjusted under 35 U.S.C. 154(b) by 0 days.

(21) Appl. No.: 14/740,612

(22) Filed: Jun. 16, 2015

(51) Int. Cl.
| | | |
|---|---|---|
| *A63H 3/06* | (2006.01) | |
| *A63H 27/10* | (2006.01) | |
| *F16B 2/08* | (2006.01) | |
| *B65D 63/10* | (2006.01) | |
| *F16M 13/02* | (2006.01) | |

(52) U.S. Cl.
CPC ............ *A63H 27/10* (2013.01); *B65D 63/1009* (2013.01); *B65D 63/1027* (2013.01); *F16B 2/08* (2013.01); *F16M 13/02* (2013.01)

(58) Field of Classification Search
USPC ................. 446/220; 248/230.1, 230.6, 230.7, 248/230.8, 511, 534; 116/173
See application file for complete search history.

(56) References Cited

U.S. PATENT DOCUMENTS

| | | | |
|---|---|---|---|
| 262,517 A | 8/1882 | Unz | |
| 1,527,046 A | 10/1922 | Ingram | |
| 1,512,831 A * | 10/1924 | Dunnell | B60R 13/00 348/230.4 |
| 1,535,396 A * | 4/1925 | Buehler | B60R 13/00 248/541 |
| 1,648,338 A * | 11/1927 | Gaines | B60R 13/00 248/230.8 |
| 1,677,379 A * | 7/1928 | Ames | E04H 12/32 248/230.9 |
| 1,782,070 A * | 11/1930 | Lazarus | A63H 33/40 248/512 |
| 1,788,157 A | 1/1931 | Hogan | |
| 2,143,691 A | 4/1938 | Goldberg et al. | |
| 2,209,875 A * | 7/1940 | Eichelsdoerfer | E04H 12/32 248/230.8 |
| 2,488,396 A | 11/1949 | Gottholm | |
| 2,664,667 A | 1/1954 | Burroughs | |
| 2,840,948 A | 7/1958 | Stickley | |
| 2,922,252 A | 1/1960 | VanDam | |
| 2,924,041 A | 2/1960 | Jackson | |
| 3,150,460 A | 9/1964 | Dees | |
| 3,162,409 A * | 12/1964 | Straayer | E04H 12/32 116/173 |
| 3,366,999 A | 2/1968 | Darby | |
| 3,439,079 A | 4/1969 | McDowell | |
| 3,892,081 A | 7/1975 | Goral | |
| 3,920,207 A * | 11/1975 | Adamaitis | A01K 97/10 224/251 |
| 4,035,462 A | 7/1977 | Lane, Jr. | |

(Continued)

FOREIGN PATENT DOCUMENTS

WO    2015195981 A1    12/2015

OTHER PUBLICATIONS

International Application No. PCT/US15/036527, filed Jul. 21, 2015 entitled "Modular Balloon Support". Search Report dated Sep. 30, 2015, 4 pages.

(Continued)

*Primary Examiner* — Kurt Fernstrom
(74) *Attorney, Agent, or Firm* — Santangelo Law Offices, P.C.

(57) ABSTRACT

The invention includes methods and apparatus for a balloon support bracket that may be secured to an attachment surface such as a light pole or fence and may further be coupled with one or more helium-free balloons through a balloon support. Additional embodiments include novel quick-release coupling and security features to enhance ease of use and deter theft.

26 Claims, 5 Drawing Sheets

(56) References Cited

U.S. PATENT DOCUMENTS

| | | | |
|---|---|---|---|
| 4,589,854 A | 5/1986 | Smith | |
| 4,712,510 A | 12/1987 | Tae-Ho | |
| 4,794,498 A | 12/1988 | Neumeier | |
| 4,895,545 A | 1/1990 | Nelson et al. | |
| 4,953,713 A | 9/1990 | Yaffe | |
| 5,027,992 A | 7/1991 | Murray | |
| 5,036,985 A | 8/1991 | Lovik | |
| 5,052,733 A | 10/1991 | Cheung et al. | |
| 5,127,867 A | 7/1992 | Lau | |
| 5,188,332 A | 2/1993 | Callas | |
| 5,203,530 A | 4/1993 | Liu | |
| 5,234,726 A | 8/1993 | Dahan | |
| 5,282,768 A | 2/1994 | Akman | |
| 5,564,575 A | 10/1996 | Casement | |
| 5,575,470 A | 11/1996 | Sherman | |
| 5,746,461 A | 5/1998 | Broberg | |
| 5,769,474 A * | 6/1998 | Moore | B25J 1/04 116/173 |
| 5,823,365 A * | 10/1998 | Page | A47F 5/0892 211/113 |
| 5,873,764 A | 2/1999 | Sherr | |
| 5,938,255 A | 8/1999 | Rose et al. | |
| 5,944,576 A | 8/1999 | Nelson | |
| 6,176,758 B1 | 1/2001 | Wu | |
| 6,273,479 B1 | 8/2001 | Carlson | |
| 6,422,914 B1 * | 7/2002 | Nelson | A63H 27/10 248/346.03 |
| 6,478,057 B1 | 11/2002 | Bearss et al. | |
| 6,478,651 B1 | 11/2002 | Weir | |
| 6,745,904 B1 | 6/2004 | Komar | |
| 6,923,141 B1 * | 8/2005 | Staats | G09F 17/00 116/173 |
| 6,935,268 B1 * | 8/2005 | Hawkins | H01Q 1/1228 116/173 |
| 6,938,871 B1 * | 9/2005 | Carlson | G09F 17/00 248/519 |
| 6,969,295 B1 | 11/2005 | Sidwell | |
| D517,123 S | 3/2006 | Sidwell | |
| 7,017,511 B2 * | 3/2006 | Fisher | G09F 17/00 116/173 |
| 7,249,991 B1 | 7/2007 | Watson | |
| 7,588,477 B2 | 9/2009 | Sidwell | |
| 7,611,395 B2 | 11/2009 | Bonsembiante | |
| D610,208 S | 2/2010 | Hou | |
| 7,810,265 B2 * | 10/2010 | Beatty | G09F 7/18 116/173 |
| 7,854,642 B2 | 12/2010 | Nelson et al. | |
| 7,967,344 B2 | 6/2011 | Herren | |
| 8,152,588 B2 | 4/2012 | Hua | |
| D659,200 S | 5/2012 | Wicken | |
| 8,544,407 B2 * | 10/2013 | Spray | E01F 9/0122 116/63 C |
| 8,789,565 B1 | 7/2014 | Wicken | |
| 8,840,440 B2 | 9/2014 | Pierce | |
| 8,968,047 B1 * | 3/2015 | Wicken | A63H 27/10 211/13.1 |
| 9,087,462 B1 * | 7/2015 | Gallus | G09F 17/00 |
| 9,089,784 B2 * | 7/2015 | Nelson | A63H 27/10 |
| 9,132,595 B1 | 9/2015 | Wicken et al. | |
| 2001/0045074 A1 | 11/2001 | Kim | |
| 2003/0071185 A1 * | 4/2003 | Casapulla | A01K 97/10 248/534 |
| 2004/0077268 A1 | 4/2004 | Wainhou | |
| 2006/0011793 A1 | 1/2006 | Dupuis et al. | |
| 2006/0289707 A1 | 12/2006 | Greenwald et al. | |
| 2006/0292960 A1 | 12/2006 | Muller | |
| 2007/0007424 A1 | 1/2007 | Sifferlin et al. | |
| 2007/0049158 A1 | 3/2007 | Chou | |
| 2007/0218802 A1 | 9/2007 | Gronethal et al. | |
| 2008/0121309 A1 | 5/2008 | Boise | |
| 2008/0166942 A1 | 7/2008 | Hou | |
| 2008/0166943 A1 | 7/2008 | Hou | |
| 2009/0197502 A1 | 8/2009 | Nelson et al. | |
| 2011/0240823 A1 | 10/2011 | Hua | |
| 2011/0290171 A1 * | 12/2011 | Brick | E04H 12/2238 116/173 |
| 2012/0015581 A1 | 1/2012 | Feldstein | |
| 2012/0211614 A1 | 8/2012 | Parello et al. | |
| 2014/0096867 A1 | 4/2014 | Cayton | |

OTHER PUBLICATIONS

International Application No. PCT/US15/036527, filed Jul. 21, 2015 entitled "Modular Balloon Support", Written Opinion dated Sep. 30, 2015, 14 pages.

* cited by examiner

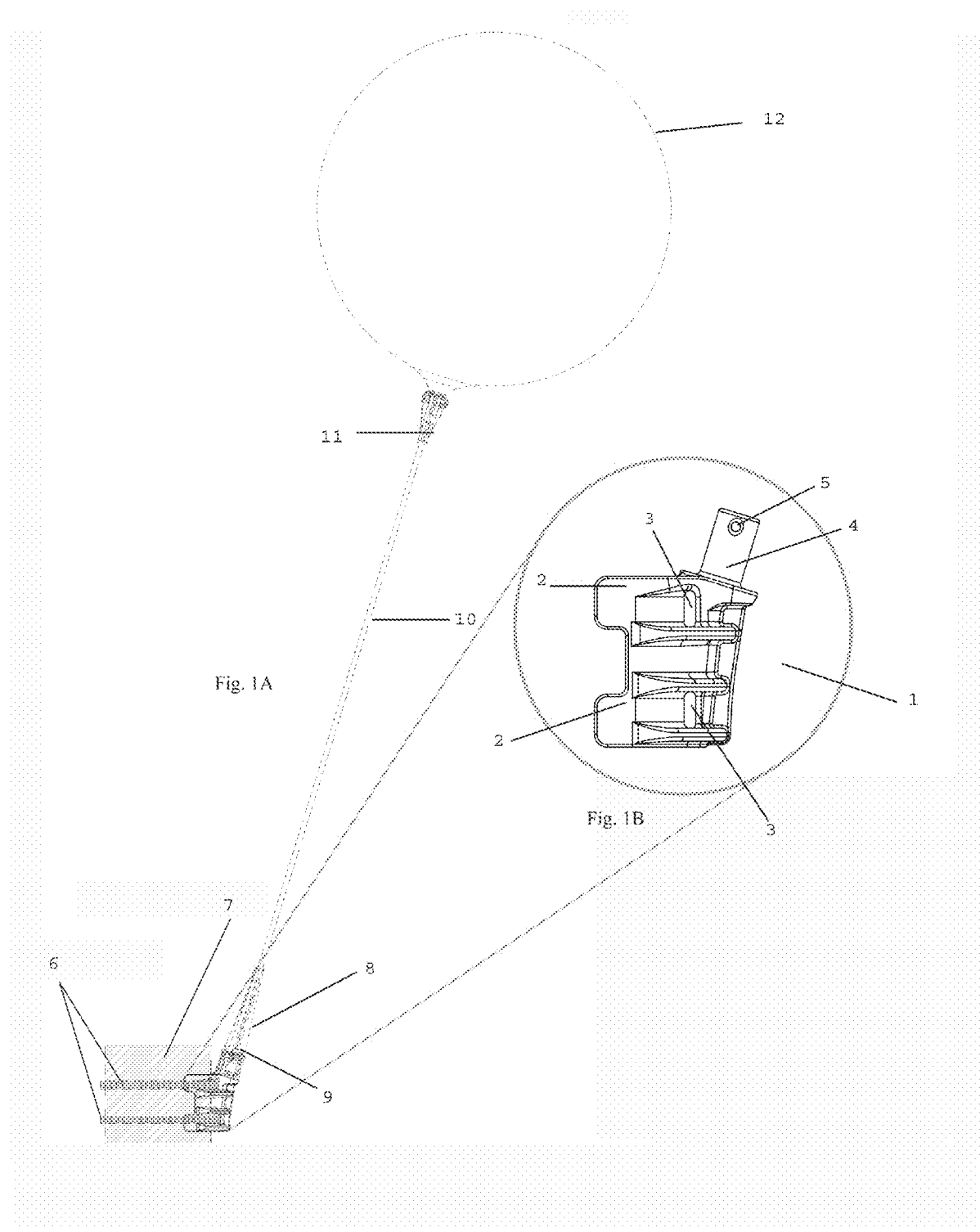

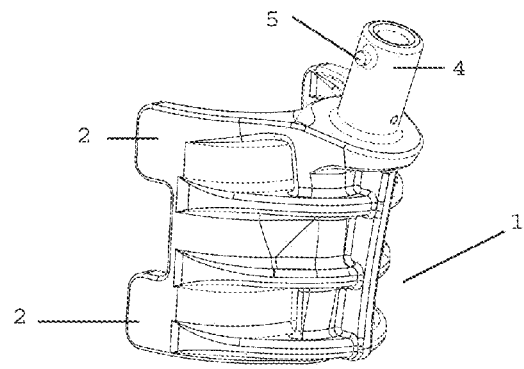
Fig. 2A
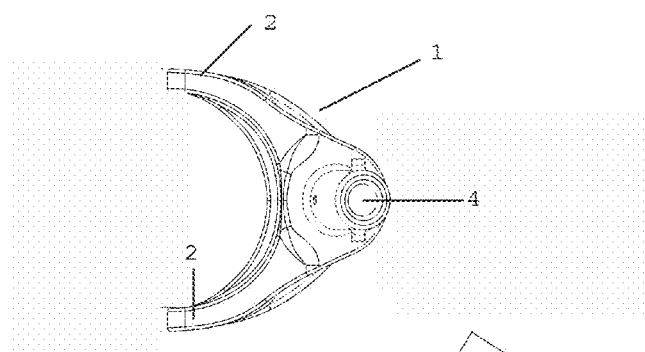
Fig. 2B
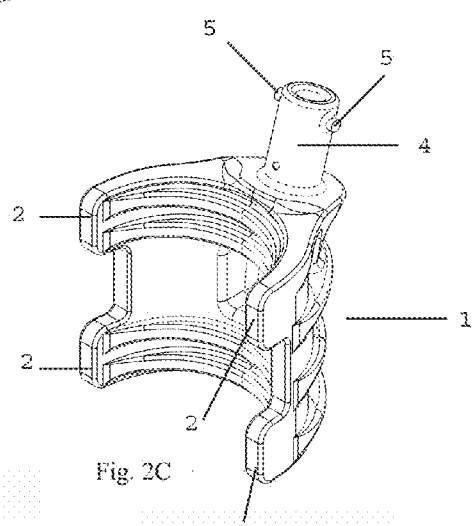
Fig. 2C
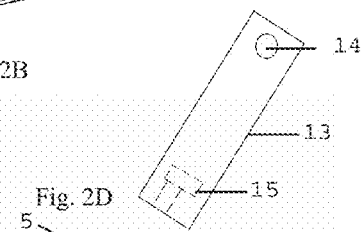
Fig. 2D
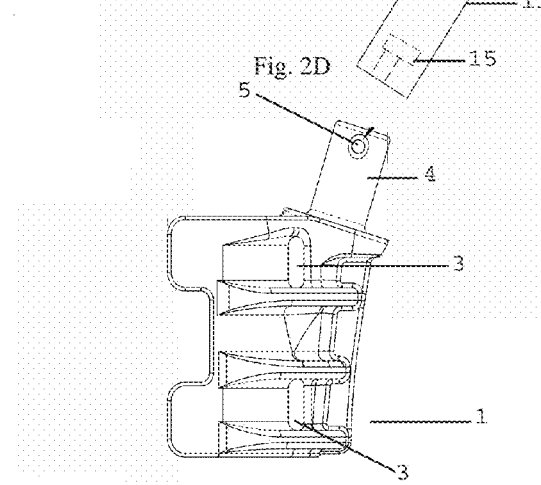
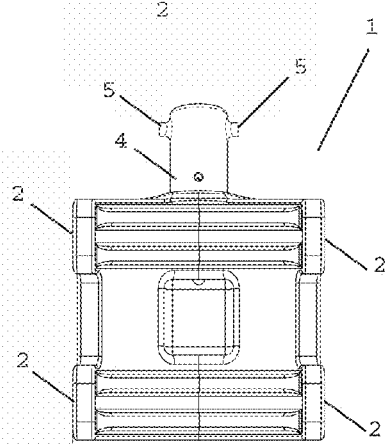
Fig. 2E

HELIUM FREE BALLOON SUPPORT BRACKET SYSTEM

TECHNICAL FIELD

Generally, the inventive technology disclosed herein relates to a novel and unique balloon support system. In a preferred embodiment, the invention may be used to support, for example, helium-free balloons and display systems that are positioned inside and/or outside commercial establishments to attract attention and/or highlight a specific promotion or event. More specifically, the inventive technology, in a preferred embodiment, described generally herein relates to an improved helium-free balloon support bracket system that may be used to secure and display marketing attractants, such as helium-free balloons and other marketing displays to various non-traditional surfaces, such as poles and fences and the like.

BACKGROUND OF THE INVENTION

Traditional marketing displays are often placed in elevated positions to both generate a clear line of sight to potential consumers, as well as to make use of generally empty space, thus maximizing the display's commercial impact without impeding the flow of consumers. Such traditional marketing displays, such as signage, flags, balloons, and even artistic presentations are often secured in elevated positions through permanent attachment devices. In such traditional systems, the display is merely held by an attachment device that has been permanently attached to a wall or other suitable structure.

While such permanent attachment devices are simple, they possess several practical drawbacks. First, such traditional systems may be difficult to elevate and secure to a desired location. Second, such traditional systems often cannot be secured to non-traditional surfaces, such as metal, brick and glass. Third, such traditional systems often cannot be secured to other attachment surfaces, such as light poles, circular poles, square poles, corners or other shaped positions, especially those that are made of non-penetrable materials such as metal. Fourth, such traditional systems are typically not strong enough to secure large displays, especially displays such as over-sized helium balloons that may exhibit significant multi-directional stresses due to, for example environmental factors such as wind. As can be seen, there is a need for a single comprehensive solution to the limitations described above.

The current invention overcomes these limitations of, and indeed surpasses the functionality of such traditional systems. It is therefore the object of the present invention to provide a simple, versatile, cost effective, helium-free balloon support bracket system that may be adjustable to fit a variety of attachment surfaces as well as having improved security features. Accordingly, the objects of the methods and apparatus described herein address each of the aforementioned problems and goals in a practical manner. Naturally, further objects of the inventive technology will become apparent from the description and drawings below.

SUMMARY OF INVENTION

It is the object of the present invention to provide a balloon support bracket system to address the comprehensive concerns outlined above. Additional objects of the current invention may also be to provide: a helium-free balloon support display bracket system having, for example, a balloon support bracket (1) configured to be secured to a variety of attachment surfaces (7). Such attachment surfaces (7) may include, but not be limited to, light poles, circular poles, square poles, fences, corners or other shaped surfaces or even planar surfaces. This balloon support bracket (1) may include at least one support bracket arm (2) which may be configured to be coupled with a specific attachment surface (7), such as a circular pole or corner fence post. The invention may also include one or more band clamps (6) configured to secure a balloon support bracket (1) to an attachment surface (7) through at least one support bracket aperture (3). Additional embodiments may include, a support bracket coupler (5) configured to be secured to at least one balloon support (16) further having a rod bracket (8) configured to be secured to said support bracket coupler (4); a rod (10) coupled with said rod bracket (8) and at least one balloon support bracket (11) and at least one helium-free balloon (12) coupled with a balloon support bracket (11). Additional embodiments may include support bracket extender (13) that may be coupled with balloon support bracket (1) and balloon support (16), or even a helium-free balloon (12) itself.

BRIEF DESCRIPTION OF THE DRAWINGS

FIG. 1A: is a balloon support bracket coupled with a balloon support and balloon with an exploded view in one embodiment thereof;

FIG. 1B: is an exploded view of a balloon support bracket in one embodiment thereof;

FIG. 2A: is a perspective view of a balloon support bracket in one embodiment thereof;

FIG. 2B: is a top view of a balloon support bracket in one embodiment thereof;

FIG. 2C: is a side perspective view of a balloon support bracket in one embodiment thereof;

FIG. 2D: is a side view of a balloon support bracket in one embodiment thereof;

FIG. 2E: is a back view of a balloon support bracket in one embodiment thereof;

DETAILED DESCRIPTION OF THE INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Referring to FIG. 1, the inventive technology may include in certain embodiments a balloon support bracket (1). This bracket may be formed, for example of a single molded form, or may be modular in design with each element being separately securable to one another. In a preferred embodiment, a balloon support bracket (1) may be formed of a composite material, such as a hard-plastic and the like. Again, generally referring to FIG. 1, in a preferred embodiment the inventive balloon support bracket (1) may include one or more support bracket arms (2).

Figure 3:
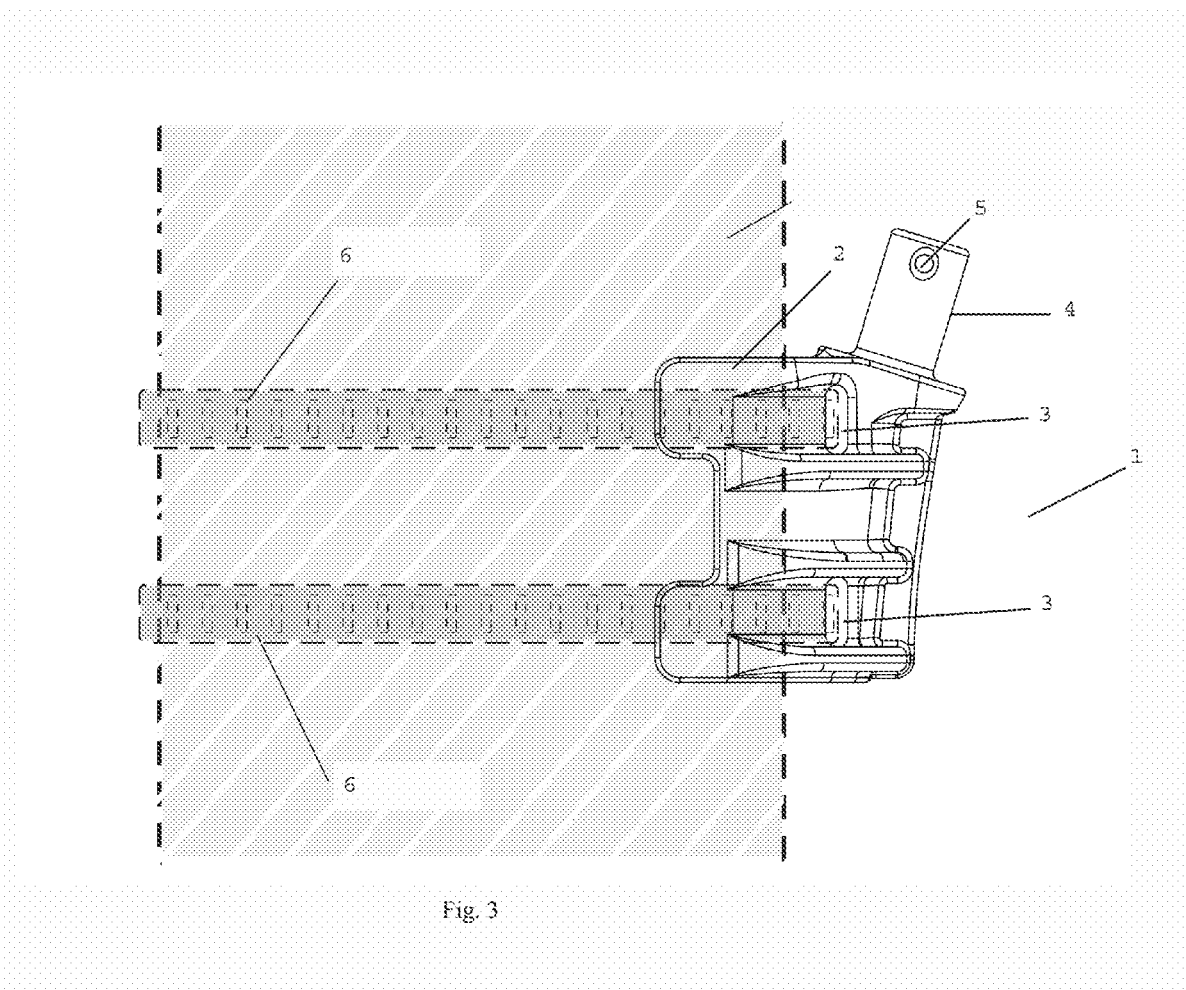
FIG. 3: is a balloon support bracket secured to a circular attachment surface in one embodiment thereof.
Figure 4:
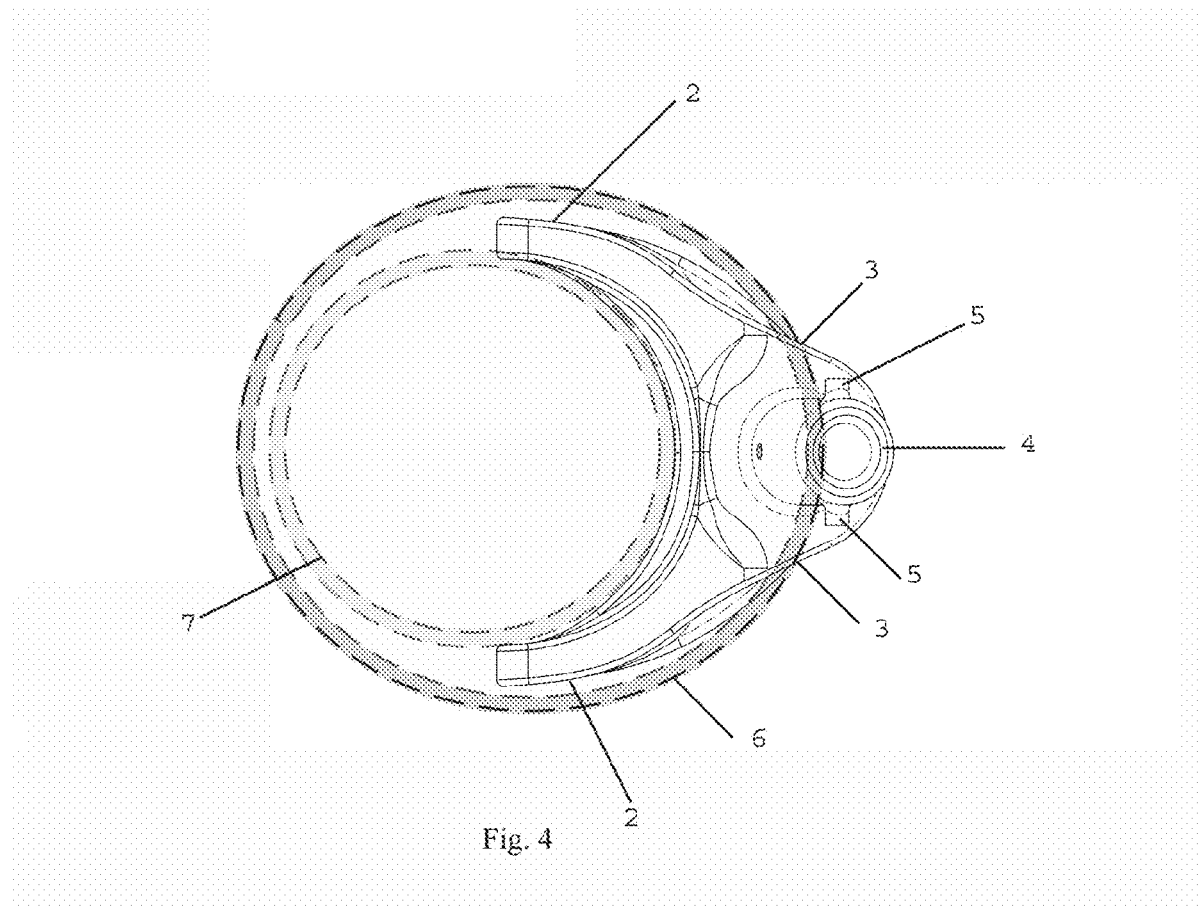
FIG. 4: is a top view of balloon support bracket secured to a circular attachment surface in one embodiment thereof.
Figure 5:
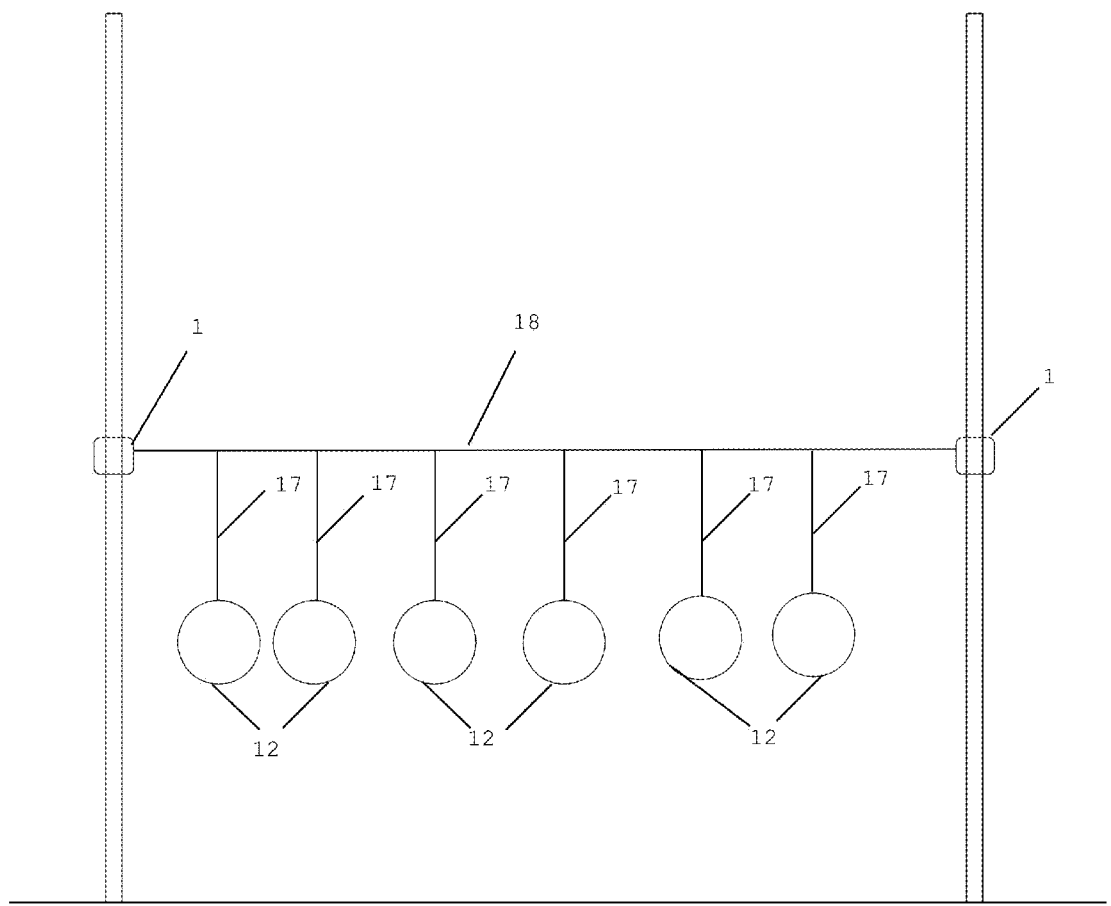
FIG. 5: is a front view of a plurality of helium-free balloons coupled to a securement line in one embodiment thereof.

As shown in FIGS. 1A, 3 and 5, in this embodiment, such support bracket arms (2) may be configured in a curvilinear shape so as to be able to conform to a circular attachment surface (7) such as a light pole, fence and the like. In additional embodiments, such support bracket arm (2) may be formed into a plurality of shapes and configurations, such as an angled configuration so as to be able to conform to a variety of surfaces, such as the sides of a building or the like. Again, referring to FIG. 1, in this preferred embodiment the plurality of support bracket arms (2) may be integral to the support bracket (1) and may be custom made to conform to specific attachment surfaces, again such as circular poles, corners or flat surfaces. Specifically, in the embodiment shown in FIGS. 1A and 3, such support bracket (1) and support bracket arms (2) form a single low-profile component that may conform to, in this instance a circular attachment surface. For example, as shown in FIGS. 2 and 5, the support bracket (1) and support bracket arms (2) may be tapered along their end-line borders. In this low profile configuration, one or more band clamp apertures (3) may be set nearly flush with the attachment surface, in this case a pole (7), such that the bracket and band clamp may be secured flush to the pole's surface with an increased surface area. As also shown in FIG. 2, the support bracket arms (2) may include tapered channels allowing the band clamp to be positioned nearly flush with the attachment surface allowing the band clamp (6) to exert an increased downward pressure thereby forming a more secure coupling such that one or more brackets may be held more firmly in place.

In this embodiment, this low profile allows for a larger surface area to be in contact with the attachment surface. Additionally, such configuration may allow, in this embodiment, a band clamp (6) to secure one, or a plurality of support brackets (1) to an attachment surface so as to exert an increased downward pressure thereby forming a more secure coupling such that the brackets may be held more firmly in place.

In another embodiment, these support bracket arms (2) may be adjustable such that it may again conform to a variety of attachment surfaces (7). In this embodiment, one or more support bracket arms (2) may be hinged, or even spring or pressure loaded so as to be adjustable or even removable in certain instances.

Referring to FIGS. 1A and 3, in one embodiment one or more balloon support brackets (1) may be secured or coupled to an attachment surface (7), in this instance a circular pole. Naturally, as noted elsewhere, such balloon support brackets (1) may indeed be coupled with a variety of other displays, such as marketing displays, signage, flags and the like. As such, the term balloon as related to support brackets (1) is merely exemplary of one preferred embodiment. In a preferred embodiment, one or more balloon support brackets (1) may be secured or coupled to an attachment surface (7) through one or multiple band clamps (6). In this embodiment, one or more band clamps (6), may be inserted through one or more support bracket apertures (3) and then secured to the desired attachment surface (7). (It should be noted that for purposes of this application, an aperture may include a hole configuration, as well as an open position, for example where an element, such as a band clamp (6) may be positioned to secure a balloon support bracket (1) to an attachment surface (7). In this embodiment, a plurality of balloon support brackets (1) may be secured or coupled to an attachment surface (7) using one or more band clamps (6).

In one preferred embodiment, said band clamp (6) may include an adjustable band, such that it may be wrapped around a desired attachment surface and tightened such that the balloon support bracket (1) is secured to the attachment surface. In one embodiment, this band clamp may include an adjustable belt band, a zip-tie or even a band clamp with an adjustable securement device (not shown) to tighten and secure the band clamp (6) to the desired attachment surface (7). Additional embodiments may include directly coupling said securement line (18) to a desired attachment surface. In additional embodiments, one or more balloon support brackets (1) may be secured to a desired attachment surface (7) through, for example, self-tapping screw and the like; a pressure seal lock, such as a suction cup or even a magnet. In another embodiment, a balloon support bracket holder (not shown) may be transiently or permanently pre-secured to a position attachment surface (7) and configured to be able to be coupled with a balloon support bracket (1). In a preferred embodiment, this coupling may include a snap, twist, slide or even a pressure or magnet lock system.

Referring to FIGS. 1B and 2, in one embodiment, the balloon support bracket (1) may include one or more balloon support (16) attachment positions. In a preferred embodiment shown in FIG. 1B, this attachment position may include a support bracket coupler (4). As shown in FIG. 1B, one or more support bracket couplers (4) may form part of a balloon support bracket (1). Additionally, such support bracket couplers (4) may be positioned so that a later-coupled helium-free balloon(s) (12) may be projected at a desired angle or configuration according to a user's need or desire. For example, in this embodiment, one or more balloon supports (16) may be secured to a support bracket coupler (4). As noted in FIG. 1, in a preferred embodiment a balloon support (16) may include a rod (10) such as a flexible rod having, in one embodiment a rod bracket (8) and possibly also a balloon support bracket (11) configured to be capable of secure one or more helium-free balloons (12), such as those manufactured as described in U.S. patent application Ser. No. 14/201,665 (incorporated herein by reference) or other display items.

As shown in FIG. 1B, in a preferred embodiment, a support bracket coupler (4) may have one or more extension lock pins (5) which may correspond to a slide lock mechanism on for example a rod bracket slide lock (9) on balloon support (16). In this embodiment, a rod bracket slide lock (9) may be inserted over the support bracket coupler (4) such that one or more extension lock pins (5) are secured with a rod bracket slide lock (9). In this manner a balloon support (16) may be configured to be removably engaged with a balloon support bracket (1). Naturally, additional embodiments may further be contemplated. For example, in one embodiment a rod bracket (8) may include one or more extension lock pins, with a support bracket coupler (4) having a corresponding slide lock position. In yet another embodiment, said balloon support (16) or even rod bracket (8) may include an extended bracket coupler (not shown) while said support bracket coupler (4) may include an insert position (not shown) configured to accept and secure the extended bracket coupler. Additional embodiments may include a variety of mechanisms to secure a balloon support (16) or even rod bracket (8) to a support bracket coupler (4). For example, such elements may be coupled through one or more of the following mechanisms: a twist lock, a screw lock, an insert plug, pressure lock, magnet lock, clamp lock, a snap lock, a spring lock and/or a mechanical catch.

In another embodiment, the inventive technology may include one or more security features. For example, in one embodiment (not specifically shown) a balloon support bracket (1) and a corresponding balloon support (16) may each include separate aperture flanges (similar to those described in U.S. Pat. No. 8,968,047 which is incorporated herein by reference) or security apertures such that a security device, like a security tie may be inserted through each and securing the balloon support (16) to support bracket coupler (4) to deter theft. In some embodiments such security apertures may correspond so as to be positioned approximate to one another when a balloon support (16) to support bracket coupler (4) are brought together. For example, both a support bracket coupler (4) and rod bracket (8) may have corresponding flanged apertures such that when coupled they are positioned approximate to one another so as to allow a security device, such as a security-tie, or lock to be inserted and secure both elements to prevent theft.

Referring to FIG. 2D, a support bracket extender (13) may be coupled with, in this embodiment, a support bracket coupler (4) and which may further be coupled with, again in this embodiment the rod bracket (8) of a balloon support (16). In this embodiment such an extender may be used to move the balloon (12) or other display to an elevated position for better visibility to consumers and the like. Again, referring to FIG. 2D, a support bracket extender (13) may be secured to a support bracket coupler (4) and/or balloon support (16) in a variety of ways. For example, in a preferred embodiment, the support bracket extender (13) may include one or more lock pins (14) which may be coupled to, for example a support bracket coupler (4), a rod bracket (8) of a balloon support (16), or even another support bracket extender (13). A support bracket extender (13) may include one or more slide locks (15) which again may be coupled to, for example a support bracket coupler (4), a rod bracket (8) of a balloon support (16), or even another support bracket extender (13). In still other embodiments, a support bracket extender (13) may include multiple prongs for the attachment of a plurality of balloon supports (16).

In other embodiments, a balloon support (16), lacking a rod bracket (8) may be directly coupled with an insert position on a balloon support bracket (1). In another embodiment, a balloon support bracket (11) may be directly coupled with an insert position on a balloon support bracket (1).

It should be noted that for the purposes of this application, while certain embodiments indicate one or more elements may be coupled and/or secured one to another, such disclosure may include the coupling of disparate elements, whether directly or indirectly, while other embodiments may include embodiments where such elements, while individually identified are formed as a unitary element. For example, in certain embodiments, a balloon support bracket (1) may be coupled with a support bracket extender (13) such that the two elements are manufactured as a single element, for example through a plastic molding process. In additional embodiments, such elements may initially be produced as separate, for example, fiberglass components, then coupled together through an overmold to form a unitary element.

Generally referring to FIG. 5, in other embodiments of the inventive technology, a plurality of balloon support brackets (1), or other securement line supports, may be placed at elevated locations and a securement line (18), such as a rope, metal wire or string and may be coupled to said balloon support brackets (1), perhaps secured in a support bracket aperture (3) or other apertured security flange. In other embodiments, a securement line (18) may be secured directly between two positions, such as poles without a specific attachment bracket. In this embodiment various helium-free balloons may be secured to said securement line (18). In a preferred embodiment, a balloon securement line (17), again such as a rope, metal wire or string may be coupled to helium-free balloon (12) through for example a plug or even balloon support bracket (11), rod (10), rod bracket (8), or balloon support (16). In this embodiment, one or more helium-free balloons (12) may be coupled to a securement line (18) and may, in some instances, freely rotate around this securement line so as to attract consumer attention. In some embodiments, mechanical stops may be placed along the securement line to prevent a balloon securement line coupled with helium-free balloon (12) to move laterally along the securement line and bunch-up at one end or the other. In other embodiments, one or more helium-free balloons (12) may be coupled to a securement line (18) such that the balloons may remain in place, for example being tightly coupled with said securement line. In an additional embodiment, a rotating bracket (not shown) may be placed over a securement line (18) and may be coupled to a helium-free balloon (12) through for example a plug or even a balloon support bracket (11), rod (10), rod bracket (8), or balloon support (16). Such a rotating bracket may be secured to the securement line in such a manner that it remains stationary while a rotational joint and/or hinge coupled to a helium-free balloon (12) through for example a plug or even balloon support bracket (11) may rotate freely, or in a specific arc. Such rotational joint may include a joint coupler that may be supported by one or more bearings allowing it to rotate the coupled balloon or other display element.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to accomplish a balloon support bracket system and the like. In this application, the methods and apparatus for the aforementioned systems are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in method-oriented terminology, each element of the claims corresponds to a device. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "supporting method and/or technique, and/or device" and even a "means for supporting." Such changes and alternative terms are to be understood to be explicitly included in the description.

Any patents, publications, or other references mentioned in this application for patent, such as in the specification or an IDS are hereby incorporated herein by reference in their entirety. Any priority case(s) claimed by this application is hereby appended and hereby incorporated herein by reference in their entirety. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety. Finally, all references listed in the list of References To Be Incorporated By Reference In Accordance With The Patent Application or other information disclosure statement and the like filed with the application are hereby appended and hereby incorporated herein by reference in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the methods and/or apparatus for providing a balloon support bracket system as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

What is claimed is:

1. A helium-free balloon support display bracket system comprising:
    at least one molded low profile balloon support bracket configured to have increased surface area contact when secured to a circular attachment surface having:
        at least one low profile tapered support bracket arm configured to have increased surface area contact when coupled with a circular attachment surface;
        at least one band clamp configured to secure said low profile balloon support bracket to said circular attachment surface through at least one support bracket aperture and said low profile tapered support bracket arm channel;
    at least one support bracket coupler configured to be secured to at least one balloon support wherein said balloon support further comprises:
        at least one rod bracket configured to be secured to said support bracket coupler;
        at least one rod coupled with said rod bracket and at least one balloon support bracket; and
        at least one helium-free balloon coupled with said balloon support bracket.

2. A helium-free balloon support display bracket system as described in claim 1 wherein said support bracket coupler comprises a support bracket coupler having at least one extension lock pin.

3. A helium-free balloon support display bracket system as described in claim 1 wherein said rod bracket comprises a rod bracket having at least one slide lock.

4. A helium-free balloon support display bracket system as described in claim 1 wherein said balloon support bracket comprises a balloon support bracket having at least one security aperture.

5. A helium-free balloon support display bracket system as described in claim 1 wherein said rod bracket comprises a rod bracket having at least one security aperture.

6. A helium-free balloon support display bracket system as described in claim 1 wherein said balloon support bracket comprises at least one plug.

7. A helium-free balloon support display bracket system as described in claim 1 wherein said band clamp comprises a band clamp selected from the group consisting of: an adjustable band clamp; an adhesive band clamp; and a zip-tie.

8. A helium-free balloon support display bracket system as described in claim 1 wherein said support bracket coupler configured to be secured to at least one balloon support comprises a said support bracket coupler selected from the group consisting of: a support bracket coupler configured to be secured to at least one balloon support bracket coupler configured to be secured to a display through at least one slide lock; a support bracket coupler configured to be secured to at least one balloon support through at least one snap lock; a support bracket coupler configured to be secured to at least one balloon support through at least one twist lock; a support bracket coupler configured to be secured to at least one balloon support through at least one pressure lock; a support bracket coupler configured to be secured to at least one balloon support through a magnet; and a support bracket coupler configured to be secured to at least one balloon support through an adhesive; a balloon support bracket configured to be secured to an attachment surface through at least one screw; a balloon support bracket configured to be secured to an attachment surface through at least one bolt.

9. A helium-free balloon support display bracket system as described in claim 1 wherein said support bracket arm comprises an adjustable support bracket arm.

10. An extendable helium-free balloon support display bracket system comprising:
   at least one low profile balloon support bracket configured to have increased surface area contact when secured to an attachment surface having:
      at least one low profile tapered support bracket arm configured to have increased surface area contact when coupled with said attachment surface;
      at least one band clamp configured to secure said low profile support bracket to said attachment surface through at least one support bracket aperture and said low profile tapered support bracket arm channel;
      at least one support bracket coupler configured to be secured to at least one support bracket extender;
   at least one balloon configured to be secured to at least one support bracket extender through at least one balloon support wherein said balloon support comprises:
      at least one rod coupled with rod bracket and at least one balloon support bracket; and
      at least one helium-free balloon coupled with said balloon support bracket.

11. An extendable helium-free balloon support display bracket system as described in claim 10 wherein said support bracket coupler comprises a support bracket coupler having at least one extension lock pin.

12. An extendable helium-free balloon support display bracket system as described in claim 10 wherein said rod bracket comprises a rod bracket having at least one slide lock.

13. An extendable helium-free balloon support display bracket system as described in claim 10 wherein said balloon support bracket comprises a balloon support bracket having at least one security aperture.

14. An extendable helium-free balloon support display bracket system as described in claim 10 wherein said rod bracket comprises a rod bracket having at least one security aperture.

15. An extendable helium-free balloon support display bracket system as described in claim 10 wherein said balloon support bracket comprises at least one plug.

16. An extendable helium-free balloon support display bracket system as described in claim 10 wherein said band clamp comprises a band clamp selected from the group consisting of: an adjustable band clamp; an adhesive band clamp; and a zip-tie.

17. An extendable helium-free balloon support display bracket system as described in claim 10 wherein said support bracket extender comprises a support bracket extender selected from the group consisting of: a support bracket extender coupled to at least one balloon support through at least one slide lock; a support bracket extender coupled to at least one balloon support through at least one snap lock; a support bracket extender coupled to at least one balloon support through at least one twist lock; a support bracket extender coupled to at least one balloon support through at least one pressure lock; a support bracket extender coupled to at least one balloon support through an magnet; and a support bracket extender coupled to at least one balloon support through an adhesive; a balloon support bracket configured to be secured to an attachment surface through at least one screw; a balloon support bracket configured to be secured to an attachment surface through at least one bolt.

18. A helium-free balloon support display bracket system as described in claim 1 and further comprising at least one support bracket extender configured to be coupled with said support bracket coupler and said rod bracket.

19. A helium-free balloon support display bracket system as described in claim 18 wherein said support bracket extender configured to be coupled with said support bracket coupler and said rod bracket comprises a support bracket extender having at least one lock pin configured to be coupled with said rod bracket slide lock; and at least one slide lock configured to be coupled with said extension lock pin on said support bracket coupler.

20. A helium-free balloon support bracket comprising:
   at least one low profile balloon support bracket configured to have increased surface area contact when secured to an attachment surface having:
      at least one support bracket coupler configured to be secured to at least one balloon support wherein said balloon support comprises:
         at least one rod bracket configured to be secured to said support bracket coupler;
         at least one rod coupled with said rod bracket and at least one balloon support bracket; and
         at least one helium-free balloon coupled with said balloon support bracket.

21. A helium-free balloon support bracket as described in claim 20 wherein said low profile balloon support bracket configured to be secured to an attachment surface comprises a balloon support bracket selected from the group consisting of: a low profile balloon support bracket configured to be secured to an attachment surface through at least one adhesive; a low profile balloon support bracket configured to be secured to an attachment surface through at least one band clamp; a low profile balloon support bracket configured to be secured to an attachment surface through at least one adjustable band clamp; a low profile balloon support bracket configured to be secured to an attachment surface through at least one zip-tie; a low profile balloon support bracket configured to be secured to an attachment surface through at least one screw lock; a low profile balloon support bracket configured to be secured to an attachment surface through at least one slide lock; a low profile balloon support bracket configured to be secured to an attachment surface through at least one snap lock; a low profile balloon support bracket configured to be secured to an attachment surface through at least one pressure lock; a low profile balloon support bracket configured to be secured to an attachment surface through at least one magnet lock; a low profile balloon support bracket configured to be secured to an attachment surface through at least one screw; a low profile balloon support bracket configured to be secured to an attachment surface through at least one bolt.

22. A helium-free balloon support bracket as described in claim 20 wherein said support bracket coupler comprises a support bracket coupler having at least one insert position.

23. A helium-free balloon support bracket as described in claim 22 wherein said insert position comprises at least one insert position selected from the group consisting of: an insert position having at least one lock pin; an insert position having at least one slide lock; an insert position having at least one twist lock; an insert position having at least one pressure lock; an insert position having at least one clamp lock; an insert position having at least one snap lock; and an insert position having at least one magnet lock.

24. A helium-free balloon support bracket as described in claim 20 wherein said rod bracket comprises at least one rod bracket coupler.

25. A helium-free balloon support bracket as described in claim 24 wherein said rod bracket coupler comprises a rod bracket coupler selected from the group consisting of: a rod bracket coupler having at least one lock pin; a rod bracket coupler having at least one slide lock; a rod bracket coupler having at least one twist lock; a rod bracket coupler having at least one pressure lock; a rod bracket coupler having at least one clamp lock; and a rod bracket coupler having at least one snap lock; a rod bracket coupler having at least one magnet lock.

26. A helium-free balloon support bracket as described in claim 20 and further comprising a support bracket extender configured to be capable of coupling with said support bracket coupler and said rod bracket.

\* \* \* \* \*